US010242314B2

(12) United States Patent
Carson

(10) Patent No.: US 10,242,314 B2
(45) Date of Patent: *Mar. 26, 2019

(54) HYPER AWARE LOGIC APPARATUS AND METHOD TO CREATE AN AGENT OF CONSCIOUSNESS AND INTENT FOR DEVICES AND MACHINES

(71) Applicant: Irvine Sensors Corp., Costa Mesa, CA (US)

(72) Inventor: John C. Carson, Corona del Mar, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,329

(22) Filed: Jan. 16, 2018

(65) Prior Publication Data
US 2018/0225571 A1 Aug. 9, 2018

Related U.S. Application Data

(63) Continuation of application No. 14/641,983, filed on Mar. 9, 2015, now Pat. No. 9,928,461.

(51) Int. Cl.
*G06N 3/02* (2006.01)
*G06N 3/04* (2006.01)
*G06N 3/08* (2006.01)

(52) U.S. Cl.
CPC ............. *G06N 3/08* (2013.01); *G06N 3/02* (2013.01); *G06N 3/04* (2013.01)

(58) Field of Classification Search
USPC ........................................................ 706/25
See application file for complete search history.

(56) References Cited

U.S. PATENT DOCUMENTS

| 5,235,672 A * | 8/1993 | Carson ............... G06N 3/0635 326/35 |
| 6,389,404 B1 * | 5/2002 | Carson ............... G06N 3/063 706/18 |
| 7,440,499 B2 * | 10/2008 | Schenk ............... H04B 3/142 375/219 |

(Continued)

OTHER PUBLICATIONS

Design and Development of Artificial Neural Networking (ANN) System Using SIGMOID Activation Function to Predict Annual Rice Production in Tamilnadus.Arun Balaji and K.Baskaran, pp. 13-31 (IJCSEIT), vol. 3, No. 1, Feb. 2013.*

(Continued)

*Primary Examiner* — Michael B Holmes
(74) *Attorney, Agent, or Firm* — W. Eric Boyd, Esq.

(57) ABSTRACT

A neural logic unit network acting as an agent to achieve machine or device consciousness and intent is disclosed. More specifically, an agent of consciousness and intent (The Agent) is disclosed consisting of neuronal logic units upon which are mapped and connected to the individual outputs of the host system's entire sensorium and which neuronal logic units are activated by the simultaneous presentation of the results of the host system's recognition, tracking, analyses and characterization computations similar to those performed by biological unconscious brains. The embodiment of the assembly of neural logic units is referred to as Hyper Aware Logic.

15 Claims, 5 Drawing Sheets

The Agent Provides Awareness, Action, Decisions & First Person Singular (FPS)
(Quantities shown are estimates of human equivalents)

(56) References Cited

U.S. PATENT DOCUMENTS

| | | | | |
|---|---|---|---|---|
| 8,510,244 | B2* | 8/2013 | Carson | G06N 3/02 706/27 |
| 9,928,461 | B2* | 3/2018 | Carson | G06N 3/02 |
| 2002/0059153 | A1* | 5/2002 | Dan | G06N 3/008 706/25 |
| 2005/0058128 | A1* | 3/2005 | Carson | G06T 7/20 370/388 |
| 2010/0241601 | A1* | 9/2010 | Carson | G06N 3/02 706/27 |
| 2017/0236054 | A1* | 8/2017 | Carson | G06N 3/02 706/25 |
| 2018/0225571 | A1* | 8/2018 | Carson | G06N 3/02 |

OTHER PUBLICATIONS

ScienceDirect Elsevier Neurocomputing vol. 74, Issues 1-3, Dec. 2010, pp. 239-255 Artificial neural networks in hardware: A survey of two decades of progress, Janardan Misra and Indranil Saha.*
Expert System, Fuzzy Logic, and Neural Network Applications in Power Electronics and Motion Control, Bimal K. Bose, Fellow, IEEE Proceedings of the IEEE. vol. 82, No. 8, Aug. 1994 pp. 1303-1323.*
IEEE Transactions on Industrial Electronics, vol. 50, No. 3, Jun. 2003 pp. 585-601 A Comprehensive Review for Industrial Applicability of Artificial Neural Networks Magali R. G. Meireles, Paulo E. M. Almeida, Student Member, IEEE, and Marcelo Godoy Simões, Senior Member, IEEE.*
"The Quest for Consciousness", Koch, 2004, Roberts and Company.
"Consciousness", Koch, 2012, MIT Press.
"The Neoruscience of Language", Pulvermuller, 2002, Cambridge.
"Thinking in Circuits" Toward Neurobiological Explanation in Cognitive Neuroscience, Pulvermuller, et al., 2013, Biological Cybernetics, Springer.
"A Million Spiking—Neuron Integrated Circuit with a Scalable Communication Network and interface", Merola et al., 2014, Science,vol. 345, No. 6197, pp. 668-6783.
"Wider Than the Sky", Edleman, 2004, R.R. Donnelley & Sons.
"Mechanical Intelligence", Turing, 1992, Elsevier Science.
"Conversations on Consciousness", Blackmore, 2006, Oxford University Press.
"The Singularity is Near", Kurzweil, 2005, Viking.
"How to Create a Mind", Kruzweil, 2012, Viking.
"The Act of Intelligent Machines", Kurzweil, 1990, MIT Press.
"The Neural Correlates of Consciousness", Metzinger, 2000, MIT Press.
"HAL's Legacy", Stork, 1997, MIT Press.

\* cited by examiner

Figure 1. The Agent Provides Awareness, Action, Decisions & First Person Singular (FPS)
(Quantities shown are estimates of human equivalents)

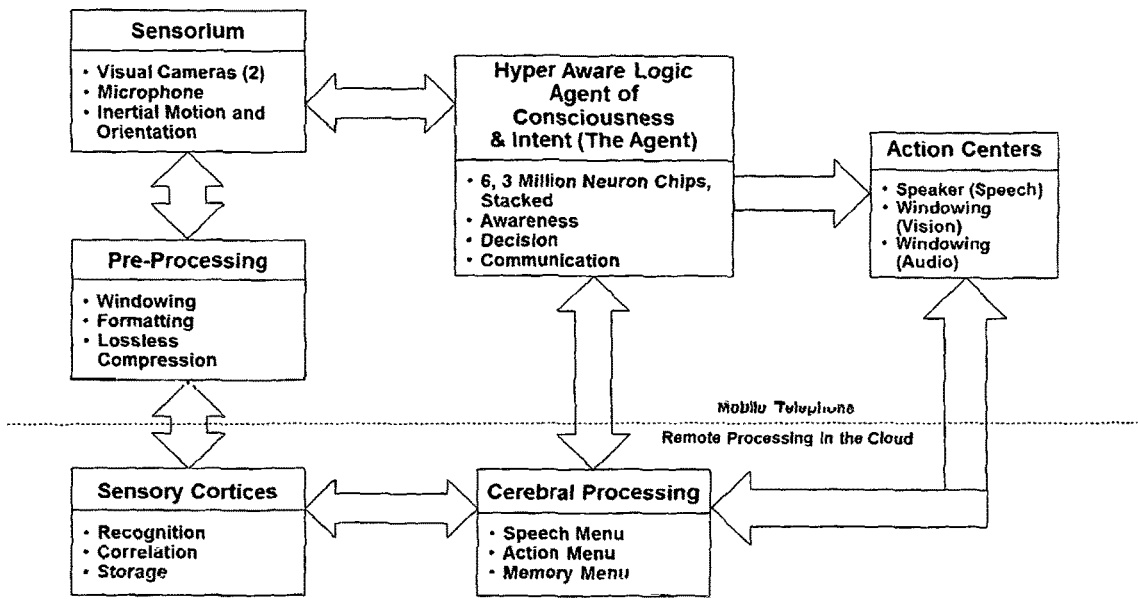
Figure 3. The Agent Provides Aware Interaction with the Mobile Telephone Owner

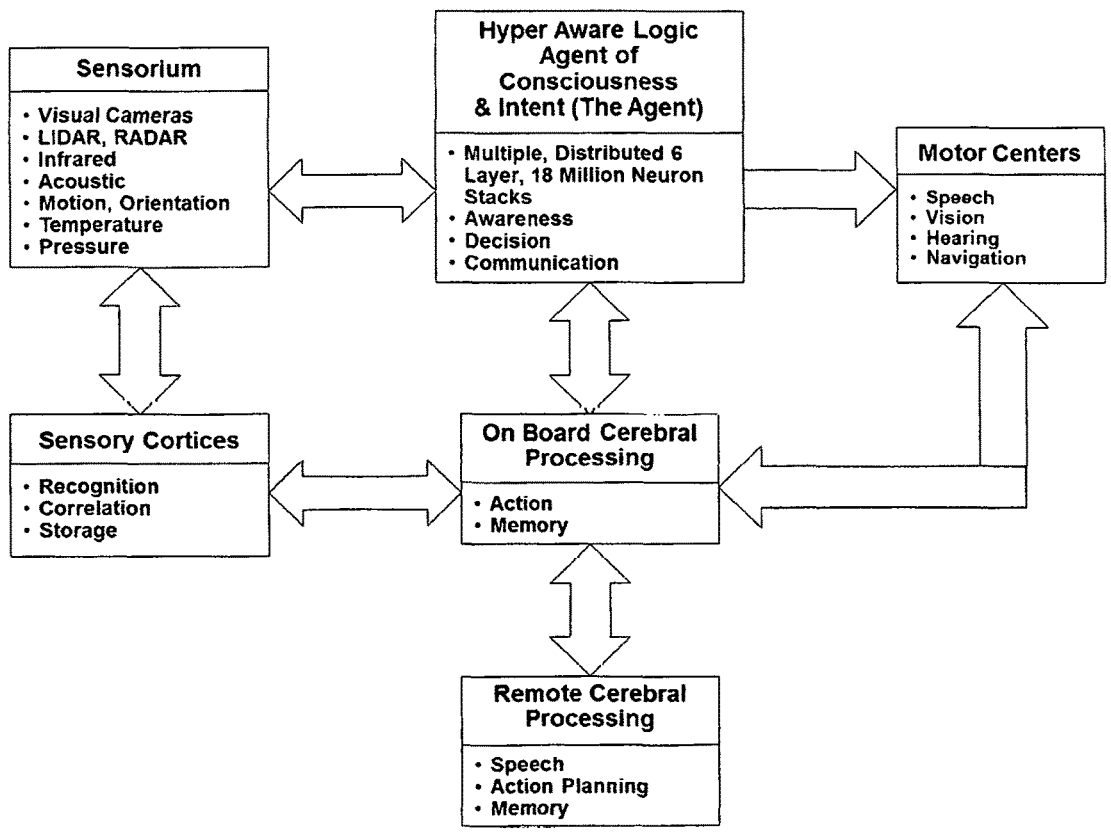
Figure 4. The Agent Provides Autonomous Navigation and Situation Awareness to Automotive Robots

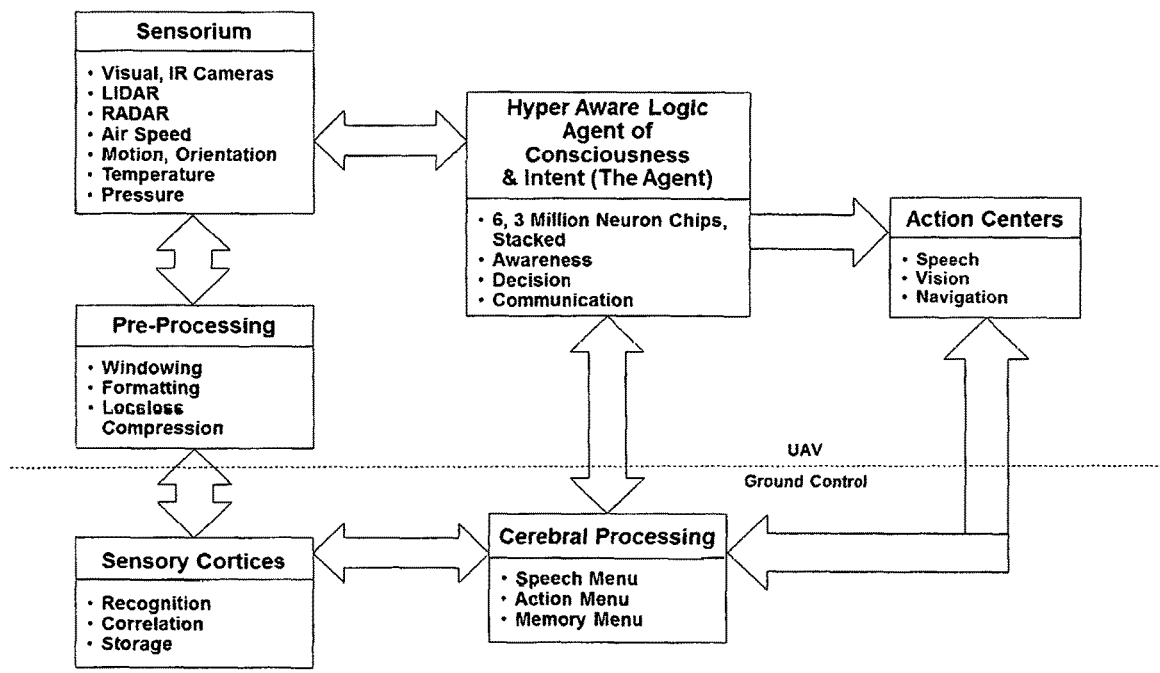
Figure 5. The Agent Endows Unmanned Aerial Aircraft with Navigational Agility and Verbal Communication // HYPER AWARE LOGIC APPARATUS AND METHOD TO CREATE AN AGENT OF CONSCIOUSNESS AND INTENT FOR DEVICES AND MACHINES

CROSS-REFERENCE TO RELATED APPLICATIONS

This application is a continuation of and claims the benefit of U.S. patent application Ser. No. 14/641,963, filed on Mar. 9, 2015, entitled "Hyper Aware Logic to Create an Agent of Consciousness and Intent for Devices and Machines", now issued as U.S. Pat. No. 9,928,461, which patent is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of cognitive sensor systems for robotics, surveillance, and machine and device interactivity with humans and other machines and devices.

More specifically, the invention, characterized as The Agent for Consciousness and Intent (The Agent), provides cognitive sensor systems with the means for consciousness, including awareness of self and surroundings, and conscious decision making. Hyper Aware Logic embodies The Agent.

2. Description of the Related Art

The invention is based upon decades, even centuries, of thought and research into the seat of consciousness within animal brains (References 1-14). As asserted by Koch and Crick (Reference 2): consciousness and the sense of self are as well-developed in lower life forms as they are in humans; consciousness is not to be confused with intelligence. Intelligence is the domain of the unconscious brain. Intelligent behavior absent consciousness, however, is probably not possible. Today neuroscience (Reference 13) is increasingly focused on the neural correlates of consciousness and Pulvermuller's most recent work (Reference 5) provides an understanding of how assemblies of neurons from all over the brain relate; for example, sensor outputs to motor responses, and form these assemblies adaptively. Based upon clues within the body of this research, the invention was conceived to fill the missing link in artificial intelligence, which up to now has been largely based upon computer science and which largely has ignored integration with sensors and action.

The missing link in the prior art is a first person singular, that is, an agent that is conscious and makes judgments and decisions based upon the options and conclusions provided by computer science. The IBM science paper (Reference 6) reports a good example of hardware and software that emulate the unconscious activities of the brain's visual system in recognizing, tracking, and characterizing objects and activities within a scene. Consciousness is not addressed; such a machine will not converse with its owner or make informed decisions on its own. The purpose of the instant invention is to add The Agent to smart devices and machines to allow them to communicate verbally, to act, and to be aware of the consequences of actual and anticipated actions.

IBM in particular, has used the largest available supercomputers, made famous by Watson that defeated humans at television (Jeopardy) and chess games. Watson is a good example of an unaware very capable machine, based upon massively parallel computer circuits to execute previously generated instructions. Lacking an Agent of Consciousness, Watson's decision making is rule-based and well-suited to chess, a game with a complete set of fixed rules. Allow the rules to change with circumstances that Watson cannot sense and it becomes lost. This becomes exacerbated when changes result from Watson's own actions, of which it is unaware.

Humans and animals interact with their environments in real time and are completely aware of their own responses, as well as the effects of their actions because there is a "they" there; each one has a sense of self and makes decisions with immediate feedback from its sensing of actual results as the action unfolds. Each one has an Agent of Consciousness and Intent that senses itself and its environment while its unconscious brain analyzes what is being sensed and prepares menus for the next step; the decision maker is the animal or human conscious self; The Agent.

BRIEF SUMMARY OF THE INVENTION

Three preferred embodiments are disclosed herein: 1) The Agent: an Aware Mobile Telephone, 2) an Aware Automotive Robot, and, 3) a Conscious Unmanned Aerial Vehicle. These embodiments are examples of a list of potential embodiments which are provided below.

Mobile telephones already have an elaborate sensorium including imaging systems, motion sensors, position sensors, hearing, and access to the internet. Mobile telephones do not have large energy supplies; hence, embedding a significant unconscious brain activity may be impractical. Therefore, in the preferred embodiment, The Agent resides in the telephone and the unconscious brain resides in remote computational resources such as the cloud accessed via the internet. The Agent is a small chipset that can be incorporated into the telephone at a negligible cost in terms of size, weight, power, and complexity.

The chipset is a 3D stack of six integrated circuit chips each representing one of the neuronal logic unit (NLU) layers with each NLU distributed vertically through the stack and connected by through silicon vias. Each layer is devoted to a specific function of The Agent: sensor inputs, word input, voting, communication, memory, and menu inputs. The Agent determines questions to be asked of the cloud and, depending upon the circumstances of which it is aware, defines the outputs to satisfy the needs of its owner.

Automotive robots are just now emerging as troop support vehicles in the military and driverless cars for the general public. The problem is accident-free navigation under all conditions at performance levels at least comparable to those driven by humans. Since humans will usually be present it must respond to direction and report when required, usually verbally. The automotive sensorium is large and complex. In the preferred embodiment, multiple six layer stacks will be employed local to individual sensor systems that are interconnected in such a way that they vote as one. Automotive robots typically have substantial embedded computing capabilities, but not nearly at human unconscious brain levels in the foreseeable future; hence access to the cloud will still be required, at least periodically.

Unmanned aircraft come in all shapes and sizes, from large weaponized drones to small package delivery systems. This preferred embodiment is for hand-launchable unmanned aerial vehicles that weigh a few pounds. They have a sensorium that can include visible and infrared imaging devices, motion and position sensors, air speed (pitot tubes) sensors, and temperature and pressure sensors as a minimum. Communication is primarily by radio and, in today's art it is primarily digital data.

The function of The Agent is to fly the plane, respond to opportunity and to communicate verbally. These small vehicles have limited embedded computing; therefore intelligence levels will be low without access to the cloud or ground control. In the preferred embodiment, the unconscious brain will reside in ground control but the link will be entirely verbal. The Agent is a single six layer chip stack communicating directly to local motor control digitally and to the ground control verbally.

Other potential embodiments may include, but will not be limited to: interactive television; security systems for large and small facilities, including mass transit, airports, harbors, financial institutions, factories, and dwellings; home appliances; manufacturing robotics; and the internet of things.

In a first aspect of the invention, an apparatus is disclosed to make machines and devices conscious and self-aware through the direct connection of each of the sensors within the machine or device and a corresponding neural logic unit which themselves are interconnected in order to jointly make choices from a menu of choices provided by a host computational resource and when the connection between each sensor and the neural logic can only be made when enabled by the host computational resource.

In a second aspect of the invention, the sensors may include visual imaging sensors, acoustic sensors, motion and orientation sensors, pressure and temperature sensors or any other sensors by which the machine or device measures its environment or itself.

In a third aspect of the invention, the sensor's measurements are from a source within its environment or within the machine or device and are in terms of electrical signals sent to the neural logic units and to the host computational resource.

In a fourth aspect of the invention, the means of enabling the connection between the sensors and the associated neural logic units is a signal from the host computational resource signifying the recognition of the source measured by the sensor.

In a fifth aspect of the invention, the assembly of many neural logic units act together to make the above choices from the above menu.

In a sixth aspect of the invention, the menu of choices provided to the assembly of neural logic units by the host computational resource is from amongst the next possible actions to be taken by the machine or device where the choices may include: selection of the focus of attention by a given sensor in terms of which sensor measurements should be considered; selection of the next word in a spoken sentence; or the selection of the any next possible action by the machine or device.

In a seventh aspect of the invention, the host computational resource is an integrated artificial neural network capable of deep learning to recognize the environment and state of machine or device, develop a plan of action, and to provide action choices to the assembly of neural logic units.

In an eighth aspect of the invention, the host computational resource consists of any remote artificial intelligence or other computer capability with which the assembly of neural logic units communicates by whatever means are available to the machine or device.

In a ninth aspect of the invention, the communication between the assembly of neural logic units and the host computational resource is over the internet.

In a tenth aspect of the invention, the invention is the achievement of artificial intelligence by adding an agent of consciousness and intent to existing computational and sensory devices and machines.

BRIEF DESCRIPTION OF THE SEVERAL VIEWS OF THE DRAWINGS

FIG. 3 is the embodiment of an Aware Mobile Telephone.

FIG. 4 is the embodiment of an Aware Automotive Robot.

FIG. 5 is the embodiment of a Conscious Unmanned Aerial Vehicle.

DETAILED DESCRIPTION OF THE INVENTION

Figure 1:
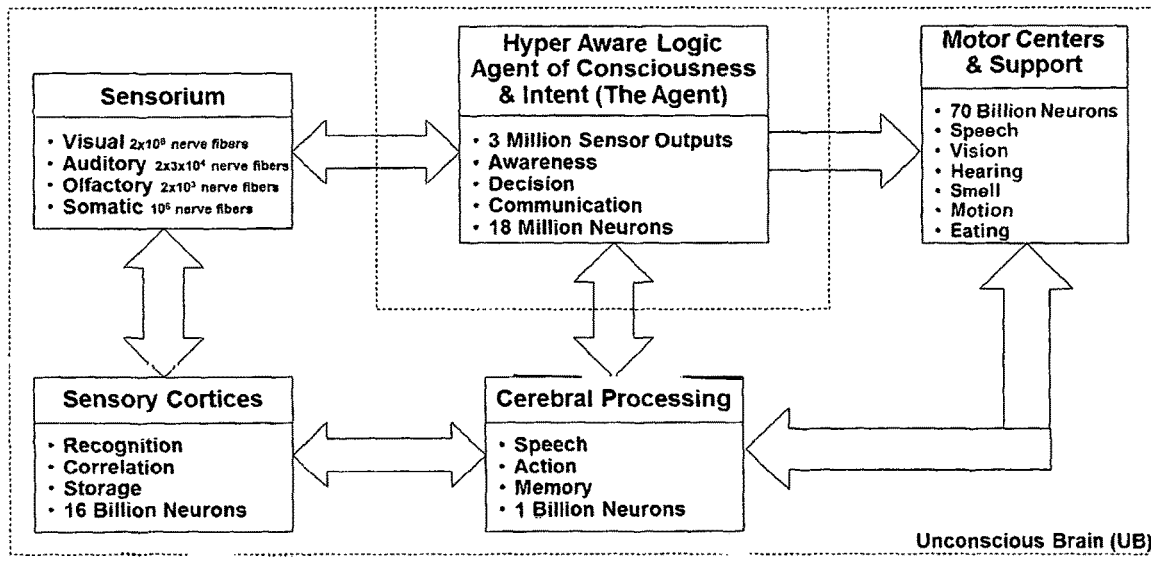
FIG. 1 is a block diagram showing the relationship of The Agent to the host cognitive system, representing the unconscious brain, so that the combination is aware, thinking and capable of making judgmental decisions.

Turning now to FIG. 1, consciousness begins with the sensorium in humans, the eyes (visual), ears (auditory), nose (olfactory), and the body (somatic) which includes skin, muscles, and some organs. The sensorium outputs (nerve fibers) connect directly and individually to The Agent which makes The Agent aware. In parallel the sensorium outputs are mapped onto the sensory cortices, which are massively parallel processors, and which basically understand that which is sensed. Understanding consists of recognition of objects, events, and behavior; correlation and tracking of objects, events, and behavior; and storage of the criteria for performing those functions which, in humans, consist of the synaptic weights within their neural networks. The sensory cortices provide an understanding of the surrounding environment and the internal environment, the self in humans and animals.

These results are transmitted to the cerebral processing, modeled after the human mid-brain where they are transformed into alternative choices for ongoing speech and other actions, a menu that is presented to The Agent for decision. In parallel these menu items are sent to motor centers where actions are initiated pending The Agent's ultimate decisions. The action initiation engenders sensorium response, especially the somatic sensors which act as confirmatory or inhibitive feedback to The Agent. Cerebral processing also selects entry into short and long term memory.

Decisions on the next step in a course of action, including the next word in a sentence, the next movement of a limb, the next look of an eye, or the additional sniff of an odor, are sent by The Agent to the relevant motor center. This box in FIG. 1 also includes all of the body maintenance that are centrally controlled.

Figure 2:
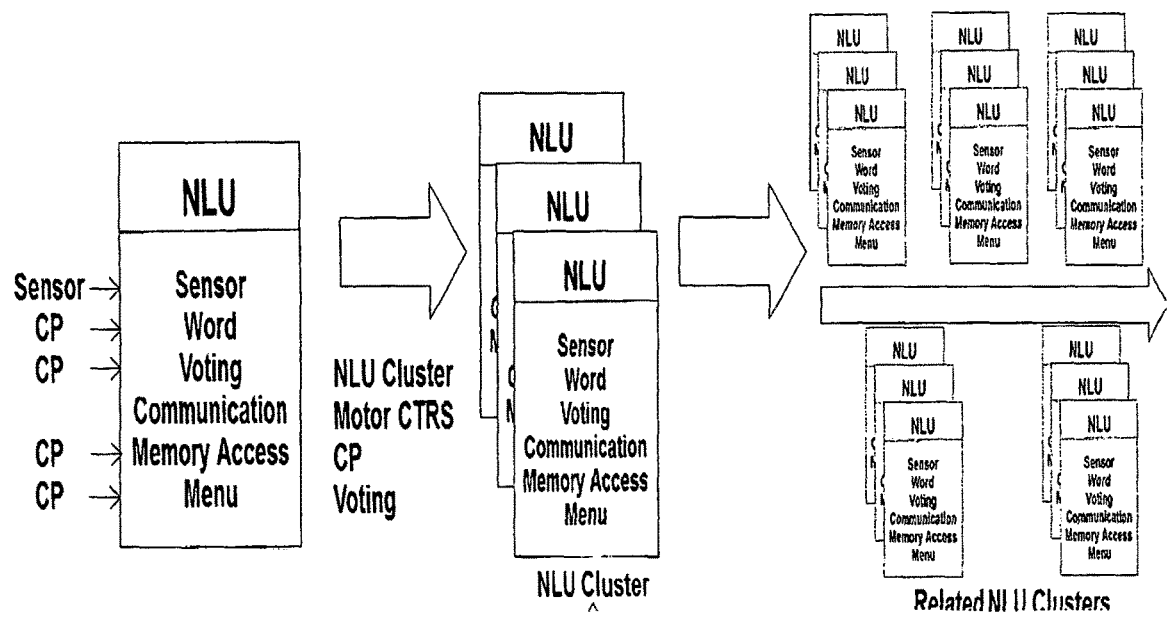
FIG. 2 is an embodiment of The Agent consisting of an assembly of neuronal logic units (NLUs) that is highly interconnected with the sensorium, the unconscious brain and each other.

Turning now to FIG. 2, The Agent of Consciousness and Intent (The Agent) is embodied by a network of Neuronal Logic Units (NLU's) of which there is one for each sensor input from the sensorium. Collectively this network of NLU's is referred to as Hyper Aware Logic, or HAL.

The basic NLU building block is a column of artificial neurons, each synaptically interconnected within that column. The number of neurons within a column is application dependent, but for most embodiments, six is typical. NLU's are instantaneously clustered and activated by the input of a word from the cerebral processor, identifying an object, an event, or a behavior. All NLU's that represent sensors associated with this word are activated together; if there is no word The Agent will be unaware of the associated sensor input. NLU clusters are related by the action sequence in which they reside. Related clusters vote on the next action within a sequence on a winner takes all basis. Grounds for choice are contained within the neuron synaptic weights activated by cerebral processor on the basis of relevance to the particular action sequence.

The value of the weights are predetermined or learned through experience. The Agent will only vote on one action at a time; a sequence of decisions may involve different words and action menu items which will re-cluster NLU's and change the NLU cluster that is defined as related. The neurons within each NLU, for this embodiment, are six in number: the first for the sensor input which may be shared with other NLU's within its cluster; the second for the enabling word from the cerebral processor; the third is to actually cast its vote depending upon prior history and feedback from other sensor inputs; the fourth is to communicate its vote to related NLU clusters and motor centers; the fifth is to respond to the cerebral processor's request for memory input or output; and the sixth is to receive the menu item upon which to vote.

Turning now to FIG. 3, The Agent is embedded in a mobile telephone. The Self of which The Agent is aware is the telephone as an extension of its owner through inclusion of the owner's body state sensors input into the Sensorium. The built-in telephone sensorium consists of multiple visual cameras, microphones, motion sensors, and orientation sensors. Unlike the human version, the unconscious brain is remote, in the cloud, accessed over the internet. This architecture enables the use of existing mobile telephone technology with only the addition of the small, stacked chipset that embodies The Agent.

A typical mobile telephone contains imaging devices with 10 megapixel or more resolution. Following the human example, The Agent only handles a small, foveated portion at a time. Selection of each window is made sequentially in the cloud-based cerebral processing based upon the salience of the content of each window as determined by the sensory cortices. As with the human case, sound and sight must be correlated, accounting for motion and orientation. Foveation, with very low resolution mapping of the rest of the image or sound, enables the use of remote operations by limiting communication requirements to manageable sub-megahertz levels. All of the communication between the elements of FIG. 3 are performed within the operational constraints of existing mobile telephones.

Turning now to FIG. 4, The Agent is embedded in an automotive robot, a typical example of which is the driverless car. Their sensorium is extensive, including many visual and infrared imaging devices, motion and orientation sensors, LIDARs and RADARs for three dimensional imaging and range finding, and "body-state" sensors ranging from fuel status to internal and external temperature sensors to tire pressure sensors and many others. An automotive robot's potential awareness exceeds even that of humans. Sensory cortices can be achieved within existing and projected automotive computational capabilities but cerebral processing will not be locally achievable in the near future; hence access to the cloud will be required and is already being used for GPS and other navigational aids. The communication links are already available in commercial and military vehicles.

Turning now to FIG. 5, The Agent enables a conscious Unmanned Aerial Vehicle. Awareness will provide an improved navigational capability with real time response to situations as they arrive. The overarching mission of such platforms, however, is the accurate reporting of its observations which requires verbalization, well beyond the computational capabilities of such aircraft. The sensorium includes visual and infrared imaging devices, occasionally LIDAR and RADAR and platform motion, orientation and air speed.

Turning now back to FIG. 2, the behavior of The Agent over a time interval is disclosed. An action sequence may begin with the detection in the low resolution visual, auditory, and/or somatic sensor fields of view of a temporal, spatial, or frequency change by the unconscious brain. The foveated NLU cluster connected to the excited sensors are activated by furnishing of The Word from the unconscious brain. The likely action is the opening of a high resolution window from the sensors, equivalent to the eye's saccade to locate the fovea at the detected object.

The correlation function within the sensory cortices will weight a given saccade or windowing with the agreement in direction of sight and sound. The related clusters include those associated with motor centers and related muscle sensors. The related clusters vote on the action to be selected from the menu. Only one such sequence is consciously undergone at any given time. Sequences are alternated at the time resolution of The Agent, nominally defined by sampling rates of the various sensors and generally lying in the range of 1-10 milliseconds. An NLU cluster will contain as many NLU's as there are nerve fibers activated by the detected event. In the visual portion of the sensorium, this number is equal to the optic nerve fibers emanating from the fovea, or about 4,000 from each eye, totaling of the order of 10,000. A group of related clusters might be as many as 10-100, all of which must be involved in the voting process.

In the human cortex each neuron communicates within 10,000 neurons and, as expected, this scale of connectivity will be required for The Agent. The specification contained in Reference 1 is a representative design solution by which this interconnectivity may be achieved.

I claim:

1. An electronic apparatus comprising:
   a sensorium comprising a plurality of sensors;
   each of the sensors having a sensor output in the form of an electrical signal;
   a plurality of artificial neuronal logic units; each neuronal logic unit comprising one or more columns of artificial neurons configured to perform at least one of a step function, a linear function or a sigmoid function;
   each of the artificial neurons electrically synaptically interconnected with one or more of the other columns by one or more electronic synapses that are configured to vary the strength of a connection between the artificial neurons based on a predetermined or learned weight received from a cerebral processor; and;
   a direct electrical connection between each of the sensor outputs within a machine or device to which the electronic apparatus is coupled and a corresponding neuronal logic unit.

2. The apparatus of claim 1 wherein the neuronal logic units are configured to cluster and activate in response to the identification of an object, event, or behavior.

3. The apparatus of claim 2 wherein the clustered neuronal logic units are interconnected and configured to jointly make a choice on a winner takes all basis.

4. The apparatus of claim 1 wherein the sensors comprise a visual imaging sensor, an acoustic sensor, a motion sensor, an orientation sensor, a pressure sensor, a temperature sensor or a sensor by which the machine or device measures its environment or itself.

5. The apparatus of claim 4 wherein a measurement from the sensors is from a source within its environment or within the machine or device and is comprised of electrical signals sent to the neuronal logic units and to a host computational resource.

6. The apparatus of claim 3 wherein the respective neuronal logic units each comprise a set of distributed functions devoted respectively to a sensor input, a word input, a voting, a communication, a memory, and a menu input.

7. The apparatus of claim 5 wherein the means for enabling the interconnection between the sensors and the clustered neuronal logic units is a word from the host computational resource signifying a recognition of a source measured by the sensor.

8. The apparatus of claim 5 wherein the clustered neuronal logic units act together and vote on a winner takes all basis to make a choice from a menu.

9. The apparatus of claim 8 wherein the winner takes all basis is determined at least in part from the menu of choices provided by the host computational resource and wherein the connection between each sensor and the neuronal logic unit is made when enabled by the host computational resource.

10. The apparatus of claim 8 wherein the menu of choices provided to the clustered neuronal logic units by the host computational resource is a set of next possible actions to be taken by the machine or device and wherein the choices comprise: a selection of a focus of attention by a sensor in terms of which sensor measurements should be considered; a selection of a next word in a spoken sentence; or a selection of a next possible action by the machine or device.

11. The apparatus of claim 5 wherein the host computational resource is an integrated artificial neural network capable of deep learning configured to recognize an environment or state of the machine or device, to develop a plan of action, and to provide an action choice to the clustered neuronal logic units.

12. The apparatus of claim 5 wherein the host computational resource is comprised of a remote artificial intelligence source or other computer capability with which the clustered neuronal logic units communicate.

13. The apparatus of claim 12 wherein the communication between the clustered neuronal logic units and the host computational resource is over the internet.

14. The apparatus of claim 1 wherein the column of artificial neurons comprises a stack of interconnected integrated circuit chip layers.

15. A method for the achievement of artificial intelligence by adding the apparatus of claim 1 to an existing computational or sensory device or machine.

* * * * *